United States Patent [19]

Irwin

[11] Patent Number: 5,212,258
[45] Date of Patent: May 18, 1993

[54] ARAMID BLOCK COPOLYMERS
[75] Inventor: Robert S. Irwin, Wilmington, Del.
[73] Assignee: E. I Du Pont de Nemours and Company, Wilmington, Del.
[21] Appl. No.: 784,346
[22] Filed: Oct. 29, 1991
[51] Int. Cl.$^5$ ............................................. C08L 77/10
[52] U.S. Cl. .................... 525/432; 525/420; 528/324; 528/335
[58] Field of Search ................. 525/432; 528/324, 335

[56] References Cited

FOREIGN PATENT DOCUMENTS 51-041097  4/1976  Japan .

OTHER PUBLICATIONS

A. Ya. Yakubovich, et al., Vysokomol. Soyed., vol. A14, pp. 1838–1842 (1972), W. R. Krigbaum et al.
J. Polym. Sci., Part A, Polym. Chem., vol. 25, pp. 653–667 (1987), W. R. Krigbaum et al.
J. Polym. Sci., Part B, Polym. Phy., vol. 25, pp. 1043–1055 (1987), W. R. Krigbaum et al.
Polym. J., vol. 20, pp. 83–91 (1988), W. R. Krigbaum et al.
J. Polym. Sci., Part C, Polym. Lett., vol. 27, pp. 59–63 (1989), W. R. Krigbaum et al.

*Primary Examiner*—Anal Carrillo
*Assistant Examiner*—Irina S. Zemel
*Attorney, Agent, or Firm*—Barbara C. Siegell

[57] ABSTRACT

Aramid block copolymers which contains blocks whose polymer chains are flexible, and blocks whose polymer chains are flexible in solution and in undrawn polymer, but relatively rigid in drawn polymer, are disclosed. The aramids are tough materials with high modulus and tensile strength. Also disclosed is a process for making such block copolymers. The copolymers are useful as fibers and films, for example in ropes and composites.

31 Claims, No Drawings

ARAMID BLOCK COPOLYMERS

FIELD OF INVENTION

This invention concerns aramid block copolymers containing two different types of blocks of aramids, one that remains flexible in solution and before and after drawing, and another that is flexible in solution and before drawing, but becomes relatively rigid after drawing. Also disclosed is a process for making such aramid block copolymers.

TECHNICAL BACKGROUND

Block copolymers in general are known to those skilled in the art, and have been made using many different types of polymers for the blocks. Block copolymers are often made in the hope of obtaining a combination of the desirable properties characteristic of each block, but the outcome is usually not predictable. Some aramid block copolymers have been previously reported.

A. Ya. Yakubovich, et al., Vysokomol. Soyed., vol. A14, p. 1838-1842 (1972), report the synthesis of various aramid block copolymers. It is believed all of these blocks remain flexible whether drawn or not. Most of these block copolymers were made by preforming both types of blocks and then reacting to combine them into a block copolymer.

In a series of papers, W. R. Krigbaum and coworkers investigated the synthesis and properties of several aramid block copolymers. All of these block copolymer contained one type of block that was always flexible, and another type of block that was rigid in solution and/or without drawing. The first of these papers [J. Polym. Sci., Part A, Polym. Chem., vol. 25, p. 653-667 (1987)] describes the synthesis of the polymers, and in all of the methods used, the authors report varying amounts of homopolymer due to inability to completely couple the blocks into a block copolymer. The second [J. Polym. Sci., Part B, Polym. Phy., vol. 25, p. 1043-1055 (1987)] and third [Polym. J., vol. 20, p. 83-91 (1988)] papers describe properties of these aramid block copolymers. The fourth paper [J. Polym. Sci., Part C, Polym. Lett., vol. 27 p. 59-63 (1989)] reports an improved synthesis using a phosphorylation reaction, which gives more efficient coupling of the aramid blocks.

Japanese Patent Application 51/041097 describes the preparation of aramid block copolymers. None of these is believed to contain an aramid block that contains flexible chains in solution and the undrawn state, that become rigid upon drawing. The polymers are reported to be made by preforming one block as a suspension of a solid in liquid, and then adding the monomers that form the second block.

SUMMARY OF THE INVENTION

This invention concerns an aramid block copolymer, comprising, two or more first aramid blocks, said first aramid being flexible in solution and in the undrawn solid polymer but is rigid after drawing of the solid polymer, and two or more second aramid blocks, said second aramid being flexible in solution and in the drawn and undrawn solid state, provided the number of repeat units in each of said first aramid blocks and said second aramid blocks is at least 3.

This invention also concerns a process for making an aramid block copolymer, comprising, in solution;

reacting a first aromatic diacid with a first aromatic diamine in such proportions that an oligomer containing at least 3 repeat units is produced, and the ends of said oligomer are derived from either said first aromatic diacid or said first aromatic diamine;

adding a second aromatic diacid and a second aromatic diamine in such amounts, and proportions to each other that an approximately equal number of second blocks as the oligomer molecules are formed, and said second blocks contain 3 or more repeat units;

to form an aramid block copolymer of first blocks composed of said first aromatic diamine and said first aromatic diacid, and of said second blocks composed of said second aromatic diamine and said second aromatic diacid; and provided that one of said first block or said second block is flexible in solution and in a solid undrawn state, and is rigid in a solid drawn state, and that one of said first block or said second block is flexible in solution and in the solid drawn and undrawn states.

DETAILS OF THE INVENTION

Aramids are polymers derived from aromatic diacids and aromatic diamines. By "aromatic diamine" is meant a compound containing two amino ($-NH_2$) groups, the amino groups being bound directly to carbon atoms of the same or different aromatic rings. It also includes compounds that contain derivatives of amino groups that can react with aromatic diacids (or their equivalents) to form amides, such as amine hydrochlorides and N-sulfinylamines.

Examples of aromatic diamines include, but are not limited to, p-phenylenediamine, m-phenylenediamine, 3,4'-oxydianiline, 2,2'-dichlorobenzidine, benzidine (4,4'-diaminodiphenyl), 2,2'-dimethylbenzidine, 2,2'-dibromobenzidine, 2-chloro-p- phenylenediamine, 2-methyl-p-phenylenediamine, 4,4'-oxydianiline, 3,4'-diaminobenzophenone, 4,4'-diaminobenzophenone, 3,4'-diaminodiphenylsulfide, 4,4'-diaminodiphenylsulfide, 3,4'-diaminodiphenylsulfone, 4 4'-diaminodiphenylsulfone, 3,4'-diaminodiphenylmethane, 4,4'-diaminodiphenylmethane, 2-(3-aminophenyl)-2-(4-aminophenyl)propane, 2,2-bis(4-aminophenyl)propane, 1,4-and 1,3-[bis(4-aminophenoxy)]benzene, 1,4- and 1,3-[bis(3-aminophenoxy)]benzene, 4,4'-[bis(3-aminophenoxy)]biphenyl, 3,3'-dimethylbenzidine, 3,3'-dimethoxybenzidine, 3,3'-dichlorobenzidine, 2,2'-dinitrobenzidine, 2,2'-bis(trifluoromethyl)benzidine, 2,2'-bis(trifluoromethoxy)benzidine, 2,2'-dicarboxybenzidine, isophthaloyldianiline, terephthaloyldianiline, 3,4'-diaminobenzanilide, and 4,4'-diaminobenzanilide.

By an "aromatic diacid" is meant a dicarboxylic acid in which the carboxyl groups ($-CO_2H$) are bound directly to the carbon atoms of the same or different aromatic rings. It also includes derivatives of carboxylic acids such as esters or acyl halides that can react with aromatic diamines to form amides. Acyl halides are preferred forms of aromatic diacids, and acyl chlorides are especially preferred. Suitable aromatic diacids include, but are not limited to, terephthalic acid, isophthalic acid, substituted terephthalic and isophthalic acids, 4,4'-bibenzoic acid, 4,4'-oxydibenzoic acid, 2,2'-dichloro-4,4'-bibenzoic acid, 2,2'-dimethyl-4,4'-bibenzoic acid, 2,2'-dibromo-4,4'-bibenzoic acid, 2,2'-dinitro-4,4'-bibenzoic acid, 3,4'-carbonyldibenzoic acid, 4,4'-carbonyldibenzoic acid, 2,6-naphthalenedicarboxylic acid, 1,4-naphthalenedicarboxylic acid, 1,5-naphthalenedicarboxylic acid, and 2,7-naphthalenedicarboxylic acid.

A block copolymer may be defined (and is meant herein) as ". . . a polymer comprising molecules in which there is a linear arrangement of blocks. A block is defined as a portion of a polymer molecule in which the monomeric units have at least one constitutional or configurational feature absent from adjacent portions. In a block copolymer, the distinguishing feature is constitutional, i.e., each of the blocks comprises units derived from a characteristic species of monomer." (Quotation from H. Mark., et al., Ed., Encyclopedia of Polymer Science and Engineering, John Wiley and Sons, New York, 1985, vol. 2, p. 324.)

Aromatic diacid/aromatic diamine combinations useful as the flexible aramid blocks [Class (3), below], include but are not limited to, isophthalic acid/m-phenylenediamine; isophthalic acid/4,4'-oxydianiline; and 4,4'-oxydi-benzoic acid/m-phenylenediamine. Isophthalic acid/m-phenylenediamine is a preferred aramid block.

An aramid useful as the rigid block [Class (2), below] is a polymer consisting essentially of 15 to 50 mole percent of I, 0 to 35 mole percent of II, and 50 mole percent of III,

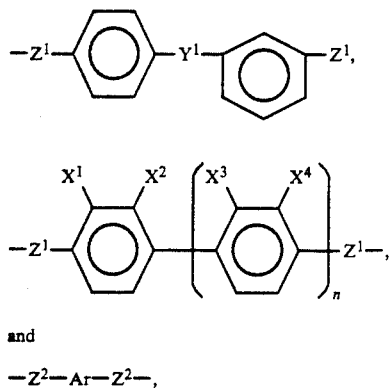

and $-Z^2-Ar-Z^2-$,  III wherein:
$Z^1$ is —NH— and $Z^2$ is —CO—, or $Z^1$ is —CO— and $Z^2$ is —NH—;
$Y^1$ is —O—, —S—, —SO$_2$— or —CO—;
n is 0 or 1;
when n is 0, $X^1$ is hydrogen and $X^2$ is chloro or methyl;
when n is 1, $X^1$ and $X^4$ are hydrogen and $X^2$ and $X^3$ are both chloro, bromo, methyl, nitro, trifluoromethyl, carboxyl and —CO$_2$R, where R is lower alkyl, or $X^2$ and $X^3$ are hydrogen and $X^1$ and $X^4$ are both chloro, methyl or methoxy;
if $Z^2$ is —NH—, Ar is p-phenylene, optionally substituted with a chloro or a methyl group; and
if $Z^2$ is —CO—, Ar is p-phenylene, optionally substituted with a chloro or a methyl group, or 2,6-naphthylene.

Another polymer useful as the as the rigid block [Class (2), below] is a polymer consisting essentially of:
(a) 10 to 25 mole percent of 4,4'-oxydianiline or 1,4-[bis(4-aminophenoxy)]benzene;
(b) 0 to 40 mole percent p-phenylenediamine;
(c) 0 to 40 mole percent chloro-p-phenylenediamine; and
(d) 50 mole percent terephthalic acid.

Preferred aromatic diacid/aromatic diamine combinations useful as the rigid (after drawing) aramid blocks [Class (2), below] include, but are not limited to: terephthalic acid/3,4'-oxydianiline; terephthalic acid/3,4'-oxydianiline and p-phenylenediamine in which the p-phenylenediamine is 75 mole percent or less of the total diamine; and terephthalic acid/phenylenediamine and 3,4'-carbonyldianiline in which the p-phenylenediamine is less than 75 mole percent of the total diamine. Terephthalic acid/3,4'-oxydianiline is an especially preferred rigid aramid.

In the composition and process disclosed herein, in each aramid block the aromatic diacid and/or the aromatic diamine from which the block is made may be a single compound or a mixture of compounds (all of which are aromatic diacids or aromatic diamines, respectively).

By the term "repeat unit" herein is meant the unit of an aramid that includes the residues of one aromatic diamine and one aromatic diacid, —NHArNHC(0)ArC(0)—, where Ar is a generalized term for any difunctional aromatic moiety. Both types of blocks in the aramid block copolymer have 3 or more repeat units. In principle, there is no upper limit on the number of repeat units in a block, but is it preferred if a block contains about 4 to 75 repeat units, and more preferred if it contains about 6 to about 50 repeat units. It will be understood by those skilled in the art that these limits represent averages of the number of repeat units, since the polymerization process inherently produces a distribution (range) of the number of repeat units in the blocks.

Either or both types of blocks may be composed of a one or more aromatic diacids and one or more aromatic diamines. When more than one aromatic diacid and/or aromatic diamine is present is a block, the repeat units will be randomly distributed, and the block itself will be a random copolymer.

For the purposes of this invention, aramid polymers may be divided into three Classes:
(1) Aramids whose polymer chains are relatively rigid in solution and/or undrawn solid polymer.
(2) Aramids whose polymer chains are relatively flexible in solution and in undrawn solid polymer, and relatively rigid in drawn solid polymer ("first aramid blocks" in claim 1).
(3) Aramids whose polymer chains are relatively flexible in solution and in undrawn and drawn solid polymer ("second aramid blocks" in claim 1).

By drawn polymer is meant polymer that is stretched at an elevated temperature below the softening point of the polymer. This is done when the polymer is "solid", that is not in solution, but with essentially neat polymer.

Aramid blocks made from Class (1) aramids are not necessary in the instant process, nor necessarily present in the aramid block copolymers of the instant invention.

The three classes of aramids may be characterized and differentiated by their reaction to stretching (drawing) at elevated temperature. The "homopolymer" should be of sufficient molecular weight to form a fiber or film. Tests are performed on a "homopolymer" (not a block copolymer) of the aramid to be tested. A fiber or film is made by methods known to those skilled in the art. It is then drawn at elevated temperature. Class (1) aramids can be drawn only about 0 to 50%, while Class (2) and (3) aramids can be drawn at least about 200%. Attempts to draw Class (1) aramids to or over 50% result in breaking of the fiber or film. To distinguish between Class (2) and Class (3) aramids, the aramids is drawn, preferably about 300 to 500%. Drawn class (2) aramids will have an initial tensile modulus of greater than about 250 grams per denier, usually combined with a break elongation of about 2 to 8%. Class (3) aramids will have a modulus of about 200 grams per denier or less, usually much less, usually with a break elongation of greater than 9%.

Aramid block copolymers of the instant invention comprise blocks of Class (2) and Class (3) aramids. In the above testing the amount of draw is calculated using the formula:

$$\% \text{ Draw} = \frac{\text{Final (drawn) Length}}{\text{Original Length}} \times 100$$

Drawing may induce crystallization in one or both classes of aramid blocks. Such polymers are included within the instant invention.

The aramid block copolymers of this invention are useful as fibers and films, and fibers are an especially preferred form. The fibers are useful as ropes and in composites. It is also preferred if the aramid block copolymer is drawn, and particularly preferred in the form of a drawn fiber. Drawing of aramids is known to those skilled in the art, see for example U.S. Pat. Nos. 3,869,430 and 4,500,278, which are hereby included by reference.

Those skilled in the art will realize that it is believed that when the aramids of Class (1) above are in solution and/or the undrawn state they are in an extended chain conformation, and they are "rigid". It is believed this is what causes the polymers to have a high initial tensile modulus. Class (2) aramids, after drawing, also are believed to be in an extended chain conformation, but in the undrawn state and in solution are believed to be in a random coil conformation. Aramids of Class (3), whether drawn, undrawn or in solution, are also believed to be in a random coil conformation, which is exhibits, for example, lower tensile modulus.

The instant invention includes a process for making the above aramid block copolymers. Class (2) and Class (3) type aramids are generally more soluble in common and relatively nontoxic organic solvents than Class (1) aramids. Complete solubility is essential for efficient coupling of the aramid blocks, and hence attaining the high molecular weight in the block copolymers necessary for optimal fiber and film properties, and for formation of fibers and films. On the other hand, inclusion of Class (2) aramids in the block copolymer gives a polymer that after drawing has the desirable properties of Class (1) aramids.

In the instant process, one of the blocks is first made in solution by reaction of an aromatic diacid (or a reactive derivative thereof) and an aromatic diamine. Such reactions are known to those skilled in the art, see for example British Patent 1,547,802, and U.S Pat. No. 3,673,143, both of which are hereby included by reference, and the Examples herein. The ratio of the reactants is chosen so that an oligomer of a known average length (molecular weight) with defined end groups is obtained. The end group may be derived from either the diamine or diacid, that is be an amine derivative or an acid (derivative), respectively. If the two reactants are designated A and B, and A is to be the end group, and the oligomer is to have an average of y repeat units, —(A–B)—, one can calculate the molar ratio of A and B needed using the following formula:

$$\frac{A}{B} = \frac{y+1}{y}$$

The second type of aramid block is then formed and the first and second blocks connected to each other by adding a second aromatic diacid and a second aromatic diamine (the first and second diacid and/or diamine may be the same, as long as the composition of the resulting first and second blocks are different). Things to be considered in the amounts and proportions of this second set of reactants are the average length of the aramid blocks to be produced, the molar amount of oligomer (first blocks, made as reactive oligomers, above) to be reacted with, and the type of end group of the oligomer. Assuming the second set of reactants is designated C and D, C is the complementary reactant for the end groups of the oligomer (A above, if A is a diacid then C is a diamine, and vice versa), and the desired average length of the second block is z repeat units, —(C–D)—, then the molar amounts of C and D needed are:

moles $C = (z + 1)$(moles oligomer)

and, moles $D = z$(moles oligomer)

where $$\text{moles of oligomer} = \frac{\text{moles of } B}{y}$$

The reaction conditions for formation of the second block and the overall block copolymer are similar to those for formation of the oligomer, see the references cited above and the Examples.

Two different classes of blocks, namely Class 2 and Class 3, are combined in this process to make the aramid block copolymer. In principle, and in most cases, this can be accomplished in either order, i.e., the Class 2 or Class 3 block being made first. However, in certain cases, one of the blocks may have relatively limited solubility in the solvent. In that case it is preferred if the aramid block having the better solubility is made first (see Example 6). For efficient coupling of the two types of blocks, and hence higher quality aramid block copolymer, it is preferred that complete solubility is maintained at all stages of the polymerization. The solubility of any particular aramid block will depend on the solvent used and composition of the aramid, and may also depend on the length of the block. In borderline cases, generally the longer (higher molecular weight) the block is, the less soluble it will be.

In the Examples, the following abbreviations are used:
ACS—apparent crystallite size
E—elongation at break
2,2'-DClPP—2,2'-dichlorobenzidine
DMAc—N,N-dimethyacetamide
gpd—grams per denier
I—isophthalic acid or isophthalate units
ICl—isophthaloyl chloride
x-mer—for an oligomer or block, x is the average number of repeat units
Mi—initial modulus MPD—m-phenylenediamine
OA—orientation angle
PPD—p-phenylenediamine
3,4'-POP—3,4'-oxydianiline
T—terephthalic acid or terephthalate units
TCl—terephthaloyl chloride
T(gpd)—tensile strength (tenacity) in grams per denier The procedure used for measuring inherent viscosity is given in U.S. Pat. No. 3,673,143, col. 17, lines 10 et seq., which is hereby included by reference. Physical properties of fiber and films were measured by the method described in U.S. Pat. No. 3,869,429, column 10, line 28 to column 11, line 10, which is hereby included by reference. All references herein to physical properties such as modulus and tensile strength refer to this method of measurement. Orientation angle and Apparent Crystallite Size were measured by methods described below.

The orientation angle may be measured (in fibers) by the following method. A bundle of filaments about 0.5 mm in diameter is wrapped on a sample holder with care to keep the filaments essentially parallel. The filaments in the filled sample holder are exposed to an X-ray beam produced by a Philips X-ray generator (Model 12045B) operated at 40 kv and 40 ma using a copper long fine-focus diffraction tube (Model PW 2273/20) and a nickel beta-filter.

The diffraction pattern from the sample filaments is recorded on Kodak DEF Diagnostic Direct Exposure X-ray film, in a Warhus pinhole camera. Collimators in the camera are 0.64 mm in diameter. The exposure is continued for about fifteen to thirty minutes (or generally long enough so that the diffraction feature to be measured is recorded at an optical density of ~1.0).

A digitized image of the diffraction pattern is recorded with a video camera. Transmitted intensities are calibrated using black and white references, and gray level (0–255) is converted into optical density. The diffraction pattern of fibers of this invention has two prominent overlapping equatorial reflections at a scattering angle of approximately 20° and 22°; the inner (~20°) reflection is used for the measurement of Orientation Angle. A data array equivalent to an azimuthal trace through the two selected equatorial peaks (i.e. the inner reflection on each side of the pattern) is created by interpolation from the digital image data file; the array is constructed so that one data point equals one-third of one degree in arc.

The Orientation Angle is taken to be the arc length in degrees at the half-maximum optical density (angle subtending points of 50 percent of maximum density) of the equatorial peaks, corrected for background. This is computed from the number of data points between the half-height points on each side of the peak (with interpolation being used, that is not an integral number). Both peaks are measured and the Orientation Angle is taken as the average of the two measurements.

Apparent Crystallite Size is derived from X-ray diffraction scans, obtained with an X-ray diffractometer (Philips Electronic Instruments; cat. no. PW1075/00) in reflection mode, using a diffracted-beam monochromator and a scintillation detector. Intensity data are measured with a rate meter and recorded by a computerized data collection and reduction system. Diffraction scans are obtained using the instrumental settings:

| Scanning Speed: | 1° 2θ per minute |

| | |
|---|---|
| Stepping Increment: | 0.025° 2θ |
| Scan Range: | 15° to 30° 2θ |
| Pulse Height Analyzer: | Differential |

Diffraction data are processed by a computer program that smooths the data, determines the baseline, and measures peak locations and heights.

The diffraction pattern of fibers from this invention is characterized by two prominent equatorial X-ray reflections. These peaks, occurring at approximately 20°–21° and 22° 2θ scattering angle), overlap substantially and may be difficult to resolve. Apparent Crystallite Size is calculated from the measurement of the half-height peak width of the first (lower scattering angle) equatorial diffraction peak. Because the two equatorial peaks overlap, the measurement of the half-height peak width is based on the half-width at half-height. For the 20°–21° peak, the position of the half-maximum peak height is calculated and the 2θ value corresponding to this intensity is measured on the low angle side. The difference between this 2θ value and the 2θ value at maximum peak height is multiplied by two to give the half-height peak (or "line") width.

In this measurement, correction is made only for instrumental broadening; all other broadening effects are assumed to be a result of crystallite size. If B is the measured line width of the sample, the corrected line width $\beta$ is $$\beta = (B^2 - b^2)^{\frac{1}{2}}$$

where 'b' is the instrumental broadening constant. 'b' is determined by measuring the line width of the peak located at approximately 28.5° 2θ in the diffraction pattern of a silicon crystal powder sample.

The Apparent Crystallite Size is given by $$ACS = (K\lambda)/(\beta \cdot \cos\theta),$$

wherein
 K is taken as one (unity)
 $\lambda$ is the X-ray wavelength (here 1.5418 Å)
 $\beta$ is the corrected line breadth in radians
 $\theta$ is half the Bragg angle (half the 2θ value of the selected peak, as obtained from the diffraction pattern).

EXAMPLE 1

MPD-I//3,4'-POP/2,2'-DClPP(50/50 molar)-T (50//50 w//w) with average 6-mer length of latter block Strategy. b 3,4'-POP/2,2'-DClPP(50/50)-T units averaging six repeat units, having amine ends, was made by appropriately adjusting the molar ratio of diamine:-diacid chloride (7:6) in a conventional low temperature aramid copolymerization. These units were combined with the amount of MPD (calculated for a 50:50 w/w ratio of MPD-I and 3,4'-POP/2,2'-DClPP(50/50)-T blocks), at a suitable concentration, and polymerized to high M.W. with ICl.

Procedure for Polymerization. A combination of 14.00 g. 3,4'-oxydianiline (3,4'-POP) (0.070 mole) and 17.71 g. 2,2'-dichlorobenzidine (2,2'-DClPP) (0.070 mole) was dissolved in 200 g. anhydrous dimethylacet-amide (DMAc) (214 ml) in a dry resin kettle fitted with a cage-type stirrer, a slow flow of dry nitrogen to exclude atmospheric moisture, provision for addition of a solid, and provision for external ice-water cooling. To the stirred solution, cooled at 10° C. was added 24.36 g. terephthaloyl chloride (TCl) (0.120 mole); external cooling was removed and the temperature allowed to increase as viscosity was built up to some modest level.

To this solution, at 10° C., was added 22.65 g. m-phenylenediamine (MPD) (0.210 mole) and 200 g. DMAc. After dissolution, this was treated with 46.63 g. isophthaloyl chloride (ICl) (0.230 mole) and polymerization allowed to proceed, with stirring and absence of external cooling, to high viscosity levels. The viscosity was lowered to more convenient levels by dilution with 50 ml. DMAc (47 g.) to provide a 18.28% solids level. The solution was heated to 100° C. and treated with 19.58 g. calcium oxide, and stirring 15 hr. at 85° C., to neutralize HCl and produce a smooth-flowing clear solution. By dilution with DMAc to 0.5% solids, inherent viscosity was 1.64. By precipitation of polymer with water, filtration, washing, drying, and redissolution at 0.5% in 100% H$_2$SO$_4$, inherent viscosity was 1.16; this is likely to be on the low side because 3,4'-POP units are slowly degraded by sulfuric acid.

Films: The block copolymer solution was cast on a clean glass plate as a 0.010" film, using a doctor knife, dried at 90° C./5 hr. in a forced air oven, soaked 15 hr. in cold water to extract CaCl$_2$, then clamped in a frame and allowed to dry at 25° C. to a clear film. This was cut in 0.25" wide strips which were stretched by hand to maximum, short of breaking, over a 1.0 curved hot plate, heated at various temperatures. Table 1 compares mechanical properties of the as-cast film with those of films drawn a total of 700% in stages from 250° C. up to 350° C.

TABLE 1

|  | Tenacity | Elongation | Modulus | Denier | Orientation Angle |
|---|---|---|---|---|---|
| As-cast | 1.0 gpd | 22% | 29 gpd | 5090 | Unoriented |
| Drawn | 5.6 gpd | 7% | 150 gpd | 880 | 6.9° |

The wide angle X-ray diffractogram of the drawn film showed a well-developed pattern, characteristic of well-oriented 3,4'-POP/2,2'-DClPP-T copolymers, superimposed on an amorphous scattering; no crystalline MPD-I was evident. Undrawn material was totally amorphous. DSC of the drawn film showed glass transition at 270° C., characteristic of the MPD-I component but there was no indication of crystalline melting (MPD-I melts at ca. 410°-426° C. with decomposition).

A 19.5% solution of MPD-I in DMAc/CaCl$_2$ was prepared by reaction of isophthaloyl chloride with m-phenylene diamine to give inherent viscosity in DMAc of 1.7. This was diluted, after neutralization with CaO, to a suitable consistency and films prepared as described in Example 1. There could be drawn a total of 450% in stages at 225° C., 235° C., and 250° C. Breakage occurred at 260° C. Mechanical properties are shown in Table 2.

TABLE 2

|  | Tenacity | Elongation | Modulus |
|---|---|---|---|
| As-Cast | 0.6 gpd | 7% | 18 gpd |
| Drawn 450% | 1.5 gpd | 17% | 41 gpd |

Drawing did not produce crystallinity or orientation, measurable by X-ray diffraction.

MPD-I//3,4'-POP/2,2'-DClPP(50/50 molar)-T (50//50 w//w) with average 12-mer length of latter block Polymerization: As in the manner of Example 1, a solution of 15.167 g. 3,4'-POP (0.0758 mole) and 19.186 g. 2,2'-DClPP (0.0758 mole) in 200 g. DMAc was treated with 28.42 g. TCl (0.14 mole) to form an amine-ended unit averaging 12-mer units. This was diluted with 200 g. DMAc and 21.420 g. MPD (0.198 mole) dissolved therein. This solution was treated with 42.630 g. ICl (0.210 mole) to form a viscous solution of high polymer of 20% solids. Inherent viscosity, by dilution to 0.5% solids with DMAc, was 1.51.

Spinning: This dope was extruded via a heat exchanger (32° C.) and a filter pack (50+100+200+325 200+100+50 mesh screens) through a 9-hole spinneret (0.005 in. dia.) into a cocurrent stream of nitrogen (3.22 in. of water pressure; 190° C.), inside a column (wall temperature 190-200° C.), via an H$_2$O water applicator to a wind-up at up to 200 m./min. Bobbins were soaked in water for 15 hr. to extract residual solvent and CaCl$_2$, and then allowed to dry in air at ambient temperature.

Drawing: Fibers were passed by machine, at a feed rate of 4.0 m./min. under slight tension across a heating plate at 96° C., and thence drawn across a 1.0" hot shoe at various temperatures and draw ratios close to maximal but consistent with continuous operability. Tensile data and X-ray apparent crystallite size (ACS) are shown in Table 3 for various conditions.

TABLE 3

| (Highest tenacity break in parentheses; elongation measured at tenacity maximum) | | | | | |
|---|---|---|---|---|---|
| Draw Conditions | Tenacity (gpd) | Elongation (%) | Modulus (gpd) | Denier (fil) | ACS (Å) |
| 320° C./400% | 5.6(5.8) | 5.4(5.6) | 181(187) | 1.28 | 21.7 |
| 350° C./475% | 5.9(6.3) | 5.4(5.9) | 207(218) | 0.86 | 31.2 |
| 380° C./525% | 6.5(7.0) | 5.6(5.5) | 219(232) | 0.79 | 40.4 |
| 400° C./550% | 6.2(6.7) | 6.1(6.4) | 224(219) | 0.65 | 41.8 |
| 400° C./525% | 5.5(6.1) | 5.5(7.2) | 210(203) | 0.55 | 42.9 |

Films: Film strips were prepared from the same dope as above by the procedure of Example 1, and drawn across a hot plate (400% at 370° C.). Tenacity/modulus were 3.9(4.7)/108(143) gpd, compared with 0.7(0.9)/24(35) for undrawn film (highest tenacity values are in parentheses).

EXAMPLE 3

MPD-I//3,4'-POP-T (50//50 w//w) with average 6-mer length of latter block

Polymerization. Strategy and procedure were similar to Example 1. A solution of 30.30 g. 3,4'-POP (0.152 mole; 16% excess) in 214 ml. DMAc was treated with 26.36 g. TCl (0.130 mole) to form an amine-ended hexamer (average). This solution was diluted with a further 214 ml. DMAc, combined with 22.70 g. MPD (0.210 mole), and treated with 47.02 g. ICl (0.232 mole) to provide a viscous, high molecular weight, block copolymer solution (20% solids). By-product HCl was neutralized by combination with 20.24 g. CaO (0.362 mole). Inherent viscosity by dilution to 0.5% solids with DMAc was 2.19 dL/g. at 30° C.

Films were cast on to a clean glass plate using a 0.10" doctor knife, dried 6 hr./90° C. in a forced air oven, soaked overnight in water at 25° C. to extract CaCl$_2$, then clamped to prevent shrinkage and dried in air for 4 hr. followed by 8 hr./80° C. These clear films showed little tendency to shrink in the above operations. They were divided into 0.25" wide strips and drawn by hand across a 1.0" curved hot shoe. Properties are shown in Table 4. The X-ray C diffractogram was characteristic of 3,4'POP-T.

TABLE 4

(max. T in parentheses)

| Draw Conditions | T (gpd) | E (%) | Mi (gpd) | O.A. | A.C.S. |
|---|---|---|---|---|---|
| As-cast | 0.74(0.84) | 28.0(56.0) | 30(34) | Un-oriented | 9.8Å |
| 348° C./650% | 4.9(5.0) | 9.7(7.3) | 72(72) | 8.5° | 46.3° |
| 250–350° in stages/650% | 4.9(5.8) | 12.7(15.6) | 80(90) | — | — |
| 358° C.(max)/700% | 5.2(5.8) | 14.0(16.7) | 78(105) | 7.5° | 39.5° |

Fibers were extruded under conditions similar to Example 2, soaked in water and dried. Fibers were drawn under various conditions as shown in Table 5, by machine.

TABLE 5

(max. T in parentheses)

| Drawing Conditions | T (gpd) | E (%) | Mi (gpd) | Den. | A.C.S. (Å) |
|---|---|---|---|---|---|
| 320° C./400% | 3.9(4.0) | 35(38) | 63(55) | 1.0 | 45.5 |
| 320° C./725% | 6.7(6.9) | 10(11.5) | 132(135) | 1.2 | 37.4 |
| 350° C./475% | 4.8(5.0) | 30(30) | 85(75) | 2.1 | 55.1 |
| 350° C./800% | 6.4(7.0) | 13(15) | 129(147) | 0.9 | 42.7 |
| 380° C./800% | 2.7(3.0) | 36(38) | 57(48) | 1.6 | — |
| 380° C./1100% | 7.1(8.2) | 16(19) | 114(111) | 0.7 | — |

EXAMPLE 4

MPD-I//3,4'-POP-T (50//50 w//w) with average 12-mer length of latter block

Polymerization: In the same manner as Example 3, a solution of 30.30 g. 3,4-'-POP (0.152 mole; an 8% excess) in 214 ml. DMAc was treated with 33.32 g. TCl (0.164 mole) to give an amine-ended oligomer having approximately 12 repeat units. This solution was combined with a further 214 ml. DMAc and 22.68 g. MPD (0.210 mole) and then treated with 40.07 g. ICl (0.197 mole). The resulting clear viscous solution was neutralized with 20.24 g. CaO (0.362 mole). Inherent viscosity in DMAc at 30° C. was 1.83.

Fibers were dry spun as for Example 2; extracted with water, and machine drawn. Fiber properties are shown in Table 6.

TABLE 6

(max. T in parentheses)

| Draw Conditions | T (gpd) | E (%) | Mi (gpd) | O.A. (Å) | A.C.S. (Å) |
|---|---|---|---|---|---|
| As-spun | 1.1(1.2) | 119(173) | 32(28) | — | — |
| 325° C./510% | 6.9(7.9) | 14(17) | 135(147) | — | — |
| 350° C./700% | 6.9(7.3) | 18(18) | 112(116) | 6.6 | 54 |
| 375° C./610% | 6.8(7.7) | 14(16) | 120(147) | 7.3 | 56 |

EXAMPLE 5

MPD-I//3,4'-POP-T (50//50) with average 25-mer length of latter

Polymerization: Procedure and quantities were the same as for Example 4, except that quantity of TCl was 31.99 g (0.158 mole) and ICl was 41.39 g. (0.204 mole). Inherent viscosity was 1.76 in DMAc at 30° C. Additional DMAc (28 ml.) was added to provide consistency, at 19% solids, most suitable for spinning.

Spinning and drawing were carried out similarly to Example 2. Fiber properties are shown in Table 7.

TABLE 7

| Draw Conditions | T (gpd) | E (%) | Mi (gpd) |
|---|---|---|---|
| As-spun | 1.2(1.3) | 151(170) | 22(31) |
| 325° C./500% | 6.2(7.2) | 7.0(9.6) | 155(158) |
| 350° C./600% | 5.5(6.3) | 13(13) | 117(153) |

EXAMPLE 6

MPD-I//3,4'-POP/PPD(50/50 molar)-T (50//50) with average 12-mer length for latter block Strategy: The relatively low solubility of 3,4'-POP/PPD(50/50)-T blocks at higher concentrations necessitated the prior preparation of the amine-ended MPD-I blocks, and subsequently building up molecular weight via the 3,4'POP/PPD-T blocks. The latter was accomplished in two stages to take account of the limited solubility of the diamine monomers.

Polymerization: Following the procedure of Example 2, a solution of 34.02 g. MPD (0.315 mole) in 722 ml. DMAc was treated with 59.47 g. ICl (0.293 mole) to form an amine-ended average dodecamer. This solution was combined with half the theoretical amounts of 3,4'-POP and PPD (see below). Half the theoretical amount of TCl was added to this stirred solution at 5°–10° C. The remainder of the diamines was added followed by the remainder of the TCl. In this way a highly viscous solution of 18.2% solids was obtained without incurring the uncertainty of partial insolubility of diamines during the course of the reaction. Theoretical amounts were: 3,4'-POP, 26.42 g. (0.132 mole); PPD, 7.132 g. (0.066 mole); TCl, 29.06 g. (0.143 mole). By-product HCl was neutralized with 32.43 g. CaO (0.579 mole). Inherent viscosity was 1.82 dL/g. in DMAc at 30° C.

Fibers were made by dry spinning and drawn, as in Example 2. Fiber properties are shown in Table 8. All specimens showed negligible crystallinity by X-ray.

TABLE 8

| Drawing Conditions | T (gpd) | E (%) | Mi (gpd) | O.A. |
|---|---|---|---|---|
| As-spun | 1.5(1.6) | 123(142) | 29(20) | Nil |
| 325° C./400% | 6.4(7.2) | 16(19) | 117(126) | — |
| 350° C./400% | 6.2(7.0) | 16(18) | 131(157) | 14.1° |
| 375° C./460% | 6.9(8.0) | 9(10) | 137(138) | 15.5° |
| 400° C./400% | 4.4(5.1) | 14(13) | 96(113) | — |

EXAMPLE 7

MPD-I//3,4'-POP/PPD(60/40)-T (50//50) with average 25-mer length

A 20% solution of polymer in DMAc/CaCl₂ was prepared by the same general procedure as Example 6 except that the high relative proportion of 3,4'-POP allowed the second block to be prepared as a single stage, with suitable adjustment of monomer proportions to give average 25-mer blocks. Inherent viscosity was 1.55 in DMAc at 30° C.

Fibers were dry-spun and drawn by the procedures of Example 2. Typical of tensile properties was T/E/-Mi=6.8(7.7) gpd/15(16)%/131(154) gpd for a 550% draw at 325° C.

COMPARATIVE EXAMPLE 2

Random copolymer corresponding to block copolymers of Examples 1 and 2.
3,4'-POP/2,2'-DClPP/MPD(21.7/21.7/56.7)-T/I (40/60)

Polymerization: Using the same equipment as in Example 1, a solution of 14.97 g. 3,4'-POP (0.0748 mole), 18.93 g. 2,2'-DClPP (0.0748 mole), and 21.13 g. MPD (0.1956 mole) in 428 ml. DMAc (400 g.) at ca. 10° C., was treated with a mixture of 28.014 g. TCl (0.138 mole) and 42.021 g. ICl (0.207 mole) to provide a 20% solution of polymer. 19.3 g. CaO (0.345 mole) was mixed in to neutralize HCl. Inherent viscosity by dilution to 0.5% solids with DMAc was 1.86 at 30° C.

Fibers. This solution was dry-spun by passing the dope through a heat exchanger at 63° C., under conditions similar to Example 2. After extraction of residual solvent and salt by soaking in water, and air-drying, the yarn was machine drawn similarly to Example 2 at elevated temperature; that melting precluded drawing at over 320° C. (cf. 400° C. in Example 2). X-Ray diffraction showed these fibers to be moderately oriented and essentially amorphous, as indicated by apparent crystallite size. Likewise, modulus of the drawn fiber is relatively low in comparison with the block copolymer. Tensile data on drawn fibers is provided in Table 9.

TABLE 9

(Highest Tensile Breaks in Parentheses)

| Draw Conditions | T (gpd) | E (%) | Mi (gpd) | Den. | A.C.S. |
| --- | --- | --- | --- | --- | --- |
| 320° C./300% | 3.6(3.9) | 29(31) | 57(54) | 1.03 | 8.8Å |
| 320° C./700% | 5.9(7.9) | 19(20) | 49(60) | 0.47 | — |
| H$_2$O/88° C./180° C. | 2.2(2.3) | 33(35) | 62(67) | 2.00 | 9.2 |

The fibers could be drawn also, to a lesser extent, through hot water.

COMPARATIVE EXAMPLE 3

Dry-spun MPD-I fibers

The MPD-I (19.5%) solution in DMAc/CaCl$_2$, of Comparative Example 1 was conventionally dry-spun under the following conditions: heat-exchanger, 120° C.; gas-temperature, 275° C.; gas-flow pressure 3.2 in. water; cell temperature, 230±3° C.; spinneret 10 holes×0.005" dia.; wind-up, 160 m./min. Residual solvent and CaCl$_2$ were extracted by soaking bobbins in water.

Dried yarn was drawn over hot plates as in the manner of Example 1. Specimens were also drawn through water at 90° C. Commercial MPD-I (Nomex®), similarly drawn in water, has T/E/Mi ~4.0/30/70 gpd. Tensile properties are shown in Table 10.

TABLE 10

| Draw Conditions | T (gpd) | E (%) | Mi (gpd) | Den. |
| --- | --- | --- | --- | --- |
| As-Spun | 0.9 | 284 | 27 | 14 |
| 325° C./500% | 5.3(6.3) | 56(53) | 49(65) | 2.2 |
| 350° C./600% | 4.4(6.0) | 60(61) | 48(53) | 2.2 |
| 350° C./500% | 4.7(5.7) | 44(58) | 54(53) | 2.4 |
| 91° C. water/87° C. | 2.6(2.9) | 61(54) | 51(54) | 3.1 |

When fibers of MPD-I were spun in similar fashion, at finer denier, from the same solution, drawing was limited to significantly lower temperatures and gave rather lower tenacities as shown in Table 11.

TABLE 11

| Draw Conditions | T (gpd) | E (%) | Mi (gpd) | Den. |
| --- | --- | --- | --- | --- |
| 250° C./507% | 3.2(3.7) | 20(23) | 64(83) | 0.5 |
| 275° C./440% | 4.2(4.4) | 49(51) | 58(59) | 0.8 |
| 300° C./520% | 3.2(4.5) | 34(35) | 46(68) | 0.4 |

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. An aramid block copolymer, comprising, two or more first aramid blocks, said first aramid being flexible in solution and in the undrawn solid polymer but is rigid after drawing of the solid polymer, and two or more second aramid blocks, said second aramid being flexible in solution and in the drawn and undrawn solid state, provided the number of repeat units in each of said first aramid blocks and said second aramid blocks is at least 3.

2. The aramid block copolymer as recited in claim 1 wherein said first aramid blocks and said second aramid blocks each have about 4 to about 75 repeat units.

3. The aramid block copolymer as recited in claim 2 wherein said first aramid blocks and said second aramid blocks each have about 6 to about 50 repeat units.

4. The aramid block copolymer as recited in claim 1 wherein monomers for said second aramid block are selected from group consisting of isophthalic acid/m-phenylenediamine; isophthalic acid/4,4'-oxydianiline; and m-phenylene-diamine/4,4'-oxydibenzoic acid.

5. The aramid block copolymer as recited in claim 2 wherein monomers for said second aramid block are selected from group consisting of isophthalic acid/m-phenylenediamine; isophthalic acid/4,4'-oxydianiline; and 4,4'-oxydibenzoic acid m-phenylenediamine.

6. The aramid block copolymer as recited in claim 1 wherein monomers for said first aramid block are terephthalic acid/3,4'-oxydianiline.

7. The aramid block copolymer as recited in claim 1 wherein said first block is a polymer consisting essentially of 15 to 50 mole percent of I, 0 to 35 mole percent of II, and 50 mole percent of III,

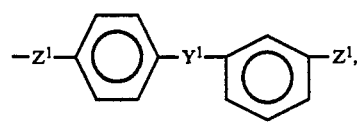

I

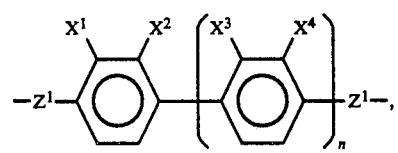

II and

III wherein:

$Z^1$ is —NH— and $Z^2$ is —CO—, or $Z^1$ is —CO— and $Z^2$ is —NH—;

$Y^1$ is —O—, —S—, —SO$_2$— or —CO—;

n is 0 or 1;

when n is 0, $X^1$ is hydrogen and $X^2$ is chloro or methyl;

when n is 1, $X^1$ and $X^4$ are hydrogen and $X^2$ and $X^3$ are both chloro, bromo, methyl, nitro, trifluoromethyl, carboxyl and —CO$_2$R, where R is lower alkyl, or $X^2$ and $X^3$ are hydrogen and $X^1$ and $X^4$ are both chloro, methyl or methoxy;

if $Z^2$ is —NH—, Ar is p-phenylene, optionally substituted with a chloro or a methyl group;

if $Z^2$ is —CO—, Ar is p-phenylene, optionally substituted with a chloro or a methyl group, or 2,6-naphthylene.

8. The aramid block copolymer as recited in claim 2 wherein said first block is a polymer consisting essentially of 15 to 50 mole percent of I, 0 to 35 mole percent of II, and 50 mole percent of III,

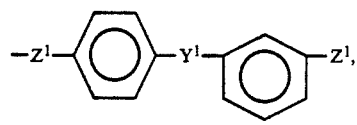   I

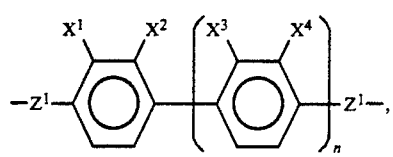   II

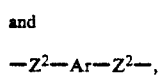

—Z$^2$—Ar—Z$^2$—,   III wherein:

$Z^1$ is —NH— and $Z^2$ is —CO—, or $Z^1$ is —CO— and $Z^2$ is —NH—;

$Y^1$ is —O—, —S—, —SO$_2$— or —CO—;

n is 0 or 1;

when n is 0, $X^1$ is hydrogen and $X^2$ is chloro or methyl;

when n is 1, $X^1$ and $X^4$ are hydrogen and $X^2$ and $X^3$ are both chloro, bromo, methyl, nitro, trifluoromethyl, carboxyl and —CO$_2$R, where R is lower alkyl, or $X^2$ and $X^3$ are hydrogen and $X^1$ and $X^4$ are both chloro, methyl or methoxy;

if $Z^2$ is —NH—, Ar is p-phenylene, optionally substituted with a chloro or a methyl group;

if $Z^2$ is —CO—, Ar is p-phenylene, optionally substituted with a chloro or a methyl group, or 2,6-naphthylene.

9. The aramid block copolymer, as recited in claim 1 wherein monomers for said second block are isophthalic acid/m-phenylenediamine.

10. The aramid block copolymer as recited in claim 6 wherein monomers for said second block are isophthalic acid/m-phenylenediamine.

11. The aramid block copolymer as recited in claim 1 wherein said first block is a polymer consisting essentially of:
(a) 10 to 25 mole percent of 4,4'-oxydianiline or 1,4-[bis(4-aminophenoxy)]benzene;
(b) 0 to 40 mole percent p-phenylenediamine;
(c) 0 to 40 mole percent chloro-p-phenylenediamine; and
(d) 50 mole percent terephthalic acid.

12. The aramid block copolymer as recited in claim 2 wherein said first block is a polymer consisting essentially of:
(a) 10 to 25 mole percent of 4,4'-oxydianiline or 1,4-[bis(4-aminophenoxy)]benzene;
(b) 0 to 40 mole percent p-phenylenediamine;
(c) 0 to 40 mole percent chloro-p-phenylenediamine; and
(d) 50 mole percent terephthalic acid.

13. The aramid block copolymer as recited in claim 1 in the form of an undrawn fiber.

14. The aramid block copolymer as recited in claim 1 in the form of a drawn fiber.

15. The aramid block copolymer as recited in claim 1 in the form of an undrawn film.

16. The aramid block copolymer as recited in claim 1 in the form of a drawn film.

17. A process for making an aramid block copolymer, comprising, in solution;

reacting a first aromatic diacid with a first aromatic diamine in such proportions that an oligomer containing at least 3 repeat units is produced, and the ends of said oligomer are derived from either said first aromatic diacid or said first aromatic diamine;

adding a second aromatic diacid and a second aromatic diamine in such amounts, and proportions to each other that an approximately equal number of second blocks as the oligomer molecules are formed, and said second blocks contain 3 or more repeat units;

to form an aramid block copolymer of first blocks composed of said first aromatic diamine and said first aromatic diacid, and of said second blocks composed of said second aromatic diamine and said second aromatic diacid; and provided that one of said first block or said second block is flexible in solution and in a solid undrawn state, and is rigid in a solid drawn state, and that one of said first block or said second block is flexible in solution and in the solid drawn and undrawn states, and further provided that no aramid blocks are produced that are rigid in the undrawn solid state or in solution.

18. The process as recited in claim 17 wherein said first blocks and said second blocks each have about 4 to 75 repeat units.

19. The process as recited in claim 18 wherein said first blocks and said second blocks each have about 6 to about 50 repeat units.

20. The process as recited in claim 17 wherein a block which is flexible in solution and in the solid undrawn state, and is rigid in a solid drawn state, is a polymer consisting essentially of 15 to 50 mole percent of I, 0 to 35 mole percent of II, and 50 mole percent of III,

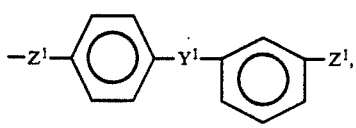   I

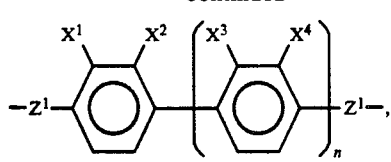

and $-Z^2-Ar-Z^2-,$     III wherein:

$Z^1$ is —NH— and $Z^2$ is —CO—, or $Z^1$ is —CO— and $Z^2$ is —NH—;

$Y^1$ is —O—, —S—, —SO$_2$— or —CO—;

n is 0 or 1;

when n is 0, $X^1$ is hydrogen and $X^2$ is chloro or methyl;

when n is 1, $X^1$ and $X^4$ are hydrogen and $X^2$ and $X^3$ are both chloro, bromo, methyl, nitro, trifluoromethyl, carboxyl and —CO$_2$R, where R is lower alkyl, or $X^2$ and $X^3$ are hydrogen and $X^1$ and $X^4$ are both chloro, methyl or methoxy;

if $Z^2$ is —NH—, Ar is p-phenylene, optionally substituted with a chloro or a methyl group;

if $Z^2$ is —CO—, Ar is p-phenylene, optionally substituted with a chloro or a methyl group, or 2,6-naphthylene.

21. The process as recited in claim 18 wherein a block which is flexible in solution and in the solid undrawn state, and is rigid in a solid drawn state, is a polymer consisting essentially of 15 to 50 mole percent of I, 0 to 35 mole percent of II, and 50 mole percent of III,

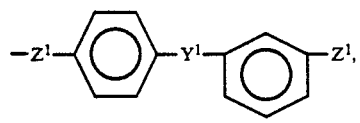
I

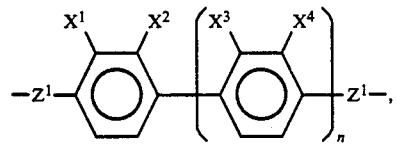
II and $-Z^2-Ar-Z^2-,$     III wherein:

$Z^1$ is —NH— and $Z^2$ is —CO—, or $Z^1$ is —CO— and $Z^2$ is —NH—;

$Y^1$ is —O—, —S—, —SO$_2$— or —CO—;

n is 0 or 1;

when n is 0, $X^1$ is hydrogen and $X^2$ is chloro or methyl;

when n is 1, $X^1$ and $X^4$ are hydrogen and $X^2$ and $X^3$ are both chloro, bromo, methyl, nitro, trifluoromethyl, carboxyl and —CO$_2$R, where R is lower alkyl, or $X^2$ and $X^3$ are hydrogen and $X^1$ and $X^4$ are both chloro, methyl or methoxy;

if $Z^2$ is —NH—, Ar is p-phenylene, optionally substituted with a chloro or a methyl group;

if $Z^2$ is —CO—, Ar is p-phenylene, optionally substituted with a chloro or a methyl group, or 2,6-naphthylene.

22. The process as recited in claim 20 wherein a block which is flexible in solution and in the solid undrawn state, and is composed from rigid in a solid drawn state, is terephthalic acid/3,4'-oxydianiline.

23. The process as recited in claim 17 wherein a block that is flexible in solution and in the solid drawn and undrawn states is composed from monomers selected from the group consisting of isophthalic acid/m-phenylenediamine; isophthalic acid/4,4'-oxydianiline; and m-phenylenediamine/4,4'-oxydibenzoic acid.

24. The process as recited in claim 18 wherein a block that is flexible in solution and in the solid drawn and undrawn states is composed from monomers selected from the group consisting of isophthalic acid/m-phenylenediamine; isophthalic acid/4,4'-oxydianiline; and m-phenylenediamine/4,4'-oxydibenzoic acid.

25. The process as recited in claim 23 wherein a block that is flexible in solution and in the solid drawn and undrawn states is composed from isophthalic acid/m-phenylenediamine.

26. The process as recited in claim 22 wherein a block that is flexible in solution and in the solid drawn and undrawn states is composed from isophthalic acid/m-phenylenediamine.

27. The process as recited in claim 17 wherein said first aromatic diacid and said second aromatic diacid are acyl halides.

28. The process as recited in claim 27 wherein said acyl halides are acyl chlorides.

29. The process as recited in claim 26 wherein said first aromatic diacid and said second aromatic diacid are acyl halides.

30. The process as recited in claim 17 wherein a block which is flexible in solution and in the solid undrawn state, and is rigid in a solid drawn state, is a polymer consisting essentially of:

(a) 10 to 25 mole percent of 4,4'-oxydianiline or 1,4-[bis(4-aminophenoxy)]benzene;

(b) 0 to 40 mole percent p-phenylenediamine;

(c) 0 to 40 mole percent chloro-p-phenylenediamine; and (d) 50 mole percent terephthalic acid.

31. The process as recited in claim 18 wherein a block which is flexible in solution and in the solid undrawn state, and is rigid in a solid drawn state, is a polymer consisting essentially of:

(a) 10 to 25 mole percent of 4,4'-oxydianiline or 1,4-[bis(4-aminophenoxy)]benzene;

(b) 0 to 40 mole percent p-phenylenediamine;

(c) 0 to 40 mole percent chloro-p-phenylenediamine; and (d) 50 mole percent terephthalic acid.

* * * * *